United States Patent Office 3,734,899
Patented May 22, 1973

3,734,899
POLYMERIZATION PROCESS AND CATALYST SYSTEM
Lawrence M. Fodor, Bartlesville, Okla., assignor to Phillips Petroleum Company
No Drawing. Filed Nov. 20, 1969, Ser. No. 878,531
Int. Cl. C08f 1/56, 3/10
U.S. Cl. 260—93.7        6 Claims

ABSTRACT OF THE DISCLOSURE

Utilization of a catalyst system formed by admixing (a) a compound of the formula $R_nAlX_{3-n}$; (b) a titanium trichloride-aluminum trichloride complex of the approximate formula $TiCl_3 \cdot ⅓AlCl_3$ and (c) a compound of the formula $M(NR_2)_m$ in the polymerization of 1-olefin results in the increased production of polymers. In the above formulas, R is selected from alkyl, cycloalkyl and aryl groups and combinations thereof, having from 1 to 12 carbon atoms, M is a Group IV–A or IV–B metal, $n$ is 1, 2 or mixtures thereof, X is halogen and $m$ is the valence of M.

BACKGROUND OF THE INVENTION

Polymers of alpha-olefins, particularly of propylene, have long been known and numerous procedures have been disclosed for their production. However, not all such procedures are attractive due to their low productivity or their failure to produce a commercially useful product. It is, therefore, highly desirable to provide a system wherein there is achieved an increased production of useful polymer.

THE INVENTION

It is thus an object of this invention to provide an improved process for the production of olefin polymers.

Another object of this invention is to provide a polymerization process in which there is obtained increased productivity.

A further object of this invention is to provide a novel catalyst system which, when employed in the polymerization of 1-olefin results in an increase in the productivity of the system.

Other aspects, objects and the several advantages of this invention will be apparent to those skilled in the art upon consideration of this disclosure.

According to this invention, I have discovered that increased productivity of polymers of 1-olefin (alpha-olefins) can be obtained when the polymerization is conducted in the presence of a catalyst system formed by admixing (a) an organoaluminum compound or mixture of such compounds of the formula $R_nAlX_{3-n}$ wherein R is alkyl, cycloalkyl, aryl or combinations thereof having 1 to 12 carbon atoms, X is a halogen and $n$ is 1, 2 or mixtures thereof; (b) a titanium trichloride-aluminum trichloride complex such as that resulting from the reaction of titanium tetrachloride and aluminum and having the approximate formula $TiCl_3 \cdot ⅓AlCl_3$; and (c) an adjuvant of the formula $M(NR_2)_m$ wherein M is a group IV–A or Group IV–B metal—germanium, tin, lead, titanium, zirconium, hafnium—N is nitrogen, R is selected from alkyls, cycloalkyl and aryl radicals and combinations thereof having from 1 to 12 carbon atoms and $m$ is the valence of M.

The enumeration of alkyl, cycloalkyl and aryl radicals herein in defining the formulas is intended to include the various mixed radicals such as alkaryl, aralkyl, alkylcycloalkyl, cycloalkylaryl, and the like.

The compounds and mixtures of compounds represented by the formula $R_nAlX_{3-n}$ and utilized as component (a) of the catalyst system of the invention are well known in the art. Examples of such compounds are diethylaluminum chloride, ethylaluminum dichloride, ethylaluminum sesquichloride, and the like.

The titanium chloride-aluminum chloride complex utilized as component (b) of the catalyst system according to this invention is also well known in the art. It can be formed, for example, by reacting titanium tetrachloride with metallic aluminum. The complex can be represented by the formula $TiCl_3 \cdot ⅓AlCl_3$.

Examples of the metal adjuvant compounds of the formula $M(NR_2)_m$ which are component (c) of the catalyst are tetrakis(dimethylamino) tin,
tetrakis(dimethylamino) titanium,
tetrakis(dicyclopropylamino) tin,
tetrakis(dicyclopropylamino) titanium,
tetrakis(diethylamino) zirconium,
tetrakis(diethylamino) lead,
tetrakis(diethylamino) tin,
tetrakis(diethylamino) titanium,
bis(di-n-butylamino)bis(diphenylamino) tin,
bis(di-n-butylamino)bis(diphenylamino) titanium,
4-cyclooctylphenylamino bis(dihexylamino) titanium,
3-cyclohexylphenylamino tris(dimethylamino) tin,
3-cyclohexylphenylamino tris(dimethylamino) titanium,
bis(dimethylamino) tin,
bis(dimethylamino) germanium,
bis(dimethylamino) titanium,
bis(diethylamino) hafnium,
tris(dimethylamino) titanium,
bis(diphenylamino)bis(diisopropylamino) tin,
bis(diphenylamino)bis(di-sec-butylamino) lead,
tetrakis(di-tert-butylamino) zirconium,
tetrakis(di-tert-butylamino) tin,
bis(didodecylamino)bis(dibenzylamino) germanium,
tetrakis(N-cyclopropylheptylamino) titanium,
and the like.

Broad and preferred ranges for the molar ratio of the catalyst components are:

| Ratio to $TiCl_3 \cdot ⅓AlCl_3$ | Broad | Preferred |
|---|---|---|
| $R_nAlX_{3-n}$ | 0.5:1 to 10:1 | 1:1 to 7.5:1 |
| $M(NR_2)_m$ | 0.01:1 to 3:1 | 0.5:1 to 2:1 |

The total catalyst concentration is usually in the range of 0.005 to 10 weight percent of the olefin being polymerized, but concentrations outside this range are operative.

The polymerization reaction is carried out either in a mass system, i.e., the olefin being polymerized acts as the reaction medium, or in an inert hydrocarbon diluent, such as a paraffin, cycloparaffin, or aromatic hydrocarbon or mixtures thereof having up to 20 carbon atoms per molecule. Examples of hydrocarbons that can be used are pentane, hexane, isooctane, eicosane, cyclohexane, methylcyclopentane, benzene, toluene, naphthalene, anthracene, and the like. When an inert diluent is used, the volume ratio of diluent to olefin is in the range of 1:1 to 10:1, preferably 3:1 to 7:1.

The polymerization is conducted at temperatures in the range of 80 to 250° F., preferably 100 to 200° F. The pressure can be sufficient to maintain the reaction mixture substantially in the liquid phase, or, particularly in a mass system, can be such that the olefin is in the vapor phase. The reaction time is in the range of 10 minutes to 75 hours, more frequently 30 minutes to 25 hours.

Although the invention is illustrated by the polymerization of propylene, any aliphatic 1-olefin having up to 8 carbon atoms per molecule can be used. Preferably those having 3 to 7 carbon atoms are used, such as propylene, 1-butene, 1-hexene, 4-methyl-1-pentene, 1-heptene, and the like. Copolymers of two or more of these olefins can be prepared using the catalyst composition of this invention.

It is within the scope of the invention to use hydrogen in a concentration of about 0.08 to 1 mol percent of the propylene for controlling the molecular weight of the polymer.

The following example will further illustrate the invention, although it is not intended that the invention be limited thereto.

EXAMPLE

Data illustrating the process of the invention were obtained by polymerizing propylene in a 1-liter, stirred reactor in 2.5-hour runs at 130° F. and about 300 p.s.i.g. with 250 grams of propylene and 1.0 liter of hydrogen (at 25° C. and 1 atmosphere) present in the reaction system. As catalyst, there was employed a mixture of diethylaluminum chloride, $TiCl_3 \cdot \frac{1}{3}AlCl_3$ and adjuvant as noted below.

The following results were obtained:

| Adjuvant | Run No. | Catalyst mol ratio DEAC: Adjuvant: $TiCl_3AA$ | Wt. percent catalyst based on olefin | Productivity | Xylenes [a] solubles (percent) | Melt [b] flow | Flexural [c] modulus p.s.i ×10- |
|---|---|---|---|---|---|---|---|
| | 1 (Control) | 5.25:0:1 | 0.108 | 738 | 7.1 | 8.73 | 183 |
| $Sn(N(CH_3)_2)_4$ [d] | 2 | 3.0:0.05.1 | 0.129 | 826 | 3.7 | 3.74 | 172 |
| $Sn(N(CH_3)_2)_4$ | 3 | 3.0:0.10:1 | 0.132 | 833 | 6.0 | 7.01 | 170 |
| $Sn(N(CH_3)_2)_4$ | 4 | 3.0:0.20:1 | 0.139 | 816 | 4.7 | 6.29 | 184 |
| $Sn(N(CH_3)_2)_4$ | 5 | 15:1:0 | 0.0542 | Trace | | | |
| $Ti(N(CH_3)_2)_4$ [e] | 6 | 15:1:0 | 0.0542 | Trace | | | |
| $Ti(N(CH_3)_2)_4$ | 7 | 3:0.05:1 | 0.065 | 890 | 7.6 | 9.16 | 161 |
| $Ti(N(CH_3)_2)_4$ | 8 | 3:0.10:1 | 0.065 | 1,100 | 9.0 | 9.39 | 176 |

[a] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[b] ASTM D 1238-62T, Condition L.
[c] ASTM D 790-63.
[d] Tetrakis(dimethylamino) tin.
[e] Tetrakis(dimethylamino) titanium.

The above data demonstrate that utilization of the process and catalyst systems of this invention results in increased productivity of a useful olefin polymer.

Reasonable variations and modifications of this invention can be made, or followed, in view of the foregoing disclosure, without departing from the spirit or scope thereof.

I claim:

1. A catalyst system formed on admixing (a) a compound of the formula $R_nAlX_{3-n}$ wherein R is an alkyl, cycloalkyl, aryl radical or combinations thereof having 1 to 12 carbon atoms, X is a halogen, and $n$ is 1, 1.5 or 2; (b) a titanium trichloride-aluminum trichloride complex of the formula $TiCl_3 \cdot \frac{1}{3}AlCl_3$; and (c) an adjuvant of the formula $M(NR_2)_m$ wherein R is selected from alkyl, cycloalkyl and aryl radicals and combinations thereof having from 1 to 12 carbon atoms, M is tin, and $m$ is the valence of M, and wherein the molar ratio of (a) to (b) is in the range of 0.5:1 to 10:1 and the molar ratio of (c) to (b) is in the range of 0.01:1 to 3:1.

2. A catalyst system according to claim 1 formed by admixing (a) diethylaluminum chloride; (b) titanium trichloride-aluminum trichloride complex of the flormula $TiCl_3 \cdot \frac{1}{3}AlCl_3$ and (c) tetrakis(dimethylamino) tin.

3. A process which comprises polymerizing an aliphatic 1-olefin having from 3 to 8 carbon atoms per molecule in the presence of a catalyst which forms on mixing (a) a compound of the formula $R_nAlX_{3-n}$ wherein R is alkyl, cycloalkyl, aryl or combinations thereof having 1 to 12 carbon atoms, X is a halogen, and $n$ is 1, 1.5 or 2; (b) a titanium trichloride-aluminum trichloride complex of the formula $TiCl \cdot \frac{1}{3}AlCl_3$; and (c) an adjuvant of the formula $M(NR_2)_m$ wherein R is selected from alkyl, cycloalkyl and aryl radicals and combinations thereof having from 1 to 12 carbon atoms, M is tin, and $m$ is the valence of M, and wherein the molar ratio of (a) to (b) is in the range of 0.5:1 to 10:1 and the molar ratio of (c) to (b) is in the range of 0.01:1 to 3:1.

4. A process according to claim 3 wherein said catalyst is formed by admixing (a) diethylaluminum chloride; (b) titanium trichloride-aluminum trichloride complex of the formula $TiCl_3 \cdot \frac{1}{3}AlCl_3$ and (c) tetrakis(dimethylamino) tin.

5. A process according to claim 3 wherein the polymerization is carried out at a temperature in the range of 80 to 250° F. and a pressure sufficient to maintain the reaction mixture in the liquid phase.

6. A process according to claim 3 wherein said 1-olefin is propylene, the admixed catalyst is present in an amount in the range of 0.005 to 10 weight percent and hydrogen is present in a concentration of about 0.08 to 1 mol percent of said olefin.

References Cited

UNITED STATES PATENTS

| | | | |
|---|---|---|---|
| 3,075,960 | 1/1963 | Lovett et al. | 260—93.7 |
| 3,173,901 | 3/1965 | Newberg et al. | 260—94.9 |
| 3,182,049 | 5/1965 | Moberly | 260—93.7 |
| 3,196,137 | 7/1965 | Cain | 260—93.7 |
| 3,462,403 | 8/1969 | Pendleton | 260—93.7 |

JAMES A. SEIDLECK, Primary Examiner

E. J. SMITH, Assistant Examiner

U.S. Cl. X.R.

252—429 C; 260—94.9 E